United States Patent [19]

Aonuma et al.

[11] Patent Number: 4,604,296

[45] Date of Patent: Aug. 5, 1986

[54] PROCESS FOR PRODUCTION OF MAGNETIC RECORDING ELEMENTS

[75] Inventors: Masashi Aonuma; Yasuo Tamai, both of Odawara, Japan

[73] Assignee: Fuji Photo Film Co., Ltd., Kanagawa, Japan

[21] Appl. No.: 673,457

[22] Filed: Nov. 20, 1984

Related U.S. Application Data

[63] Continuation-in-part of Ser. No. 193,320, Oct. 2, 1980, abandoned.

[30] Foreign Application Priority Data

Oct. 2, 1979 [JP] Japan ................................ 54-126967

[51] Int. Cl.$^4$ ........................................... H01F 10/02
[52] U.S. Cl. ....................................... 427/57; 427/132
[58] Field of Search ............................... 427/127–132, 427/48

[56] References Cited

U.S. PATENT DOCUMENTS 4,146,671  3/1979  Fujiyama et al. .................. 428/328

*Primary Examiner*—Bernard D. Pianalto
*Attorney, Agent, or Firm*—Sughrue, Mion, Zinn, Macpeak and Seas

[57] ABSTRACT

A process for producing a magnetic recording element using a ferromagnetic metal fine powder produced by a dry reduction method is disclosed, the improvement which comprises washing the ferromagnetic metal fine powder with an aqueous solvent or an organic solvent having high polarity, and optionally contacting the powder with an aqueous solution of a surface active agent, before preparing a coating composition of the powder.

20 Claims, No Drawings

PROCESS FOR PRODUCTION OF MAGNETIC RECORDING ELEMENTS

CROSS-REFERENCE TO RELATED APPLICATION

This application is a continuation-in-part of our co-pending application Ser. No. /193,320, filed on Oct. 2nd, 1980 now abandoned.

BACKGROUND OF THE INVENTION

1. Field of the Invention

This invention relates to a process for the production of magnetic recording elements, more particularly to a process for producing magnetic recording elements such as magnetic tapes, sheets, discs and cards, etc., in which a finely powdered ferromagnetic metal(s) is/are used for magnetic recording, e.g., sound-recording, image-recording, memory, etc.

2. Description of the Prior Art

Ferromagnetic powders hitherto in magnetic recording elements include $\gamma$-$Fe_2O_3$, Co-containing $\gamma$-$FeO_3$, $Fe_3O_4$, Co-containing $Fe_3O_4$, Bertholide iron oxide, Co-containing Bertholide iron oxide, $CrO_2$ and the like. These ferromagnetic substances, however, suffer from limitations in recording magnetic signals having a short recording wave length or narrowed track width, that is, when used in high density recording they are not satisfactory in magnetic characteristics such as coercive force (Hc: Oe) and maximum residual magnetic reflux density (Br: Gauss).

Ferromagnetic substances having suitable characteristics for the high density recording include finely powdered ferromagnetic metals. Magnetic tapes produced using such ferromagnetic metal fine powder are in practical use as "metal tape" and have received increasing attention in the field of audio cassettes.

The following methods of producing such ferromagnetic metal fine powders are known:

(1) Organic acid salts of ferromagnetic metals are heat-decomposed and reduced in reducing gases, as described, for example, in U.S. Pat. Nos. 3,186,829 and 3,190,748.

(2) Needle-shaped oxyhydroxides, mixtures of such needle-shaped oxyhydroxides and other metals, or needle-shaped iron oxides obtained from such oxyhydroxides are reduced, as described, for example, in U.S. Pat. Nos. 3,598,568, 3,634,063, 3,607,219, 3,607,220 and 3,702,270.

(3) Ferromagnetic metals are evaporated in low-pressure inert gases, as described, for example, in Japanese Patent Applications (OPI) 25662/73 and 25663/73.

(4) Metal carbonyl compounds are decomposed by heating, as described, for example, in U.S. Pat. Nos. 2,983,997, 3,172,776, 3,200,007 and 3,228,882.

(5) Fine ferromagnetic metal powders are electrically precipitated using a mercury cathode and then separated from mercury, as described, for example, in U.S. Pat. Nos. 3,198,777, 3,156,650 and 3,262,812.

(6) Salts of metals capable of producing ferromagnetic substances are reduced in aqueous solution by reducing substances such as, for example, borohydride compounds, hypophosphites, hydrazine, etc., as described, for example, in U.S. Pat. Nos. 3,607,218, 3,756,866, 3,206,338, 3,494,760, 3,535,104, 3,567,525, 3,661,556, 3,663,318, 3,669,643, 3,672,867, 3,700,499, 3,726,664, 3,837,912, 3,865,627, 3,932,293, 3,943,012, 3,966,510, 4,007,072, 4,009,111, 4,020,236 and 4,074,012.

Methods (1) to (4) are grouped as dry methods while methods (5) and (6) are grouped as wet methods.

While the above described ferromagnetic metal fine powders (or ferromagnetic alloy powders) have excellent magnetic characteristics in comparison with the above described ferromagnetic fine powders of the oxide type (for example, $\gamma$-$Fe_2O_3$, $Fe_3O_4$, $CrO_2$ and these oxides with other metals added thereto), they are easily subject to oxidation, are chemically unstable and deteriorate in magnetic characteristics with the passage of time. Furthermore, since they may ignite when allowed to stand in air in the state of a powder, they are specified as a dangerous article in Group 2 of the Japanese Fire Defence Law.

To increase the recording density of magnetic recording elements, it is desirable to minimize magnetic particle size; however, when particle size is made smaller, the above described problems occur more markedly.

Therefore, there has been employed a method where, after formation of a ferromagnetic metal fine powder, a protective layer is provided on the surface of the metal particles by surface-treatment to increase chemical stability. For example, the following are known: treating with oxidizing substances such as chromic acid salts, permanganic acid salts, etc. (Japanese Patent Applications (OPI) 112465/76 and 5038/78); coating with an organic substance (Japanese Patent Applications (OPI) 21251/77, 155398/77, 141202/78 and 76958/78), and treating with a reactive gas (Japanese Patent Applications (OPI) 123601/74 and 85054/77).

Particularly, in the case of ferromagnetic metal fine powders produced by dry methods (1) to (4), the above stabilization treatment is of importance. In dry methods it is known that metals easily catch fire as a result of abrupt oxidation after production thereof as fresh surfaces of the metals are directly exposed to air.

To stabilize metal particles produced by dry methods there is generally employed a method where by gradually increasing the oxygen pressure in the atmosphere after formation of the particles an oxide layer is provided on the surface of the particles, thus preventing metals from igniting. In addition to oxygen, reactive gases such as $H_2S$ can also be used.

It has further been confirmed that insufficient stabilization results in the problem that even after formation of a magnetic layer (metals in combination with a binder) the metals easily catch fire at relatively low temperatures, that the formation of a uniform oxide layer generally improves wetting between such a binder and the oxide layer (permitting the formation of a magnetic layer having good planar properties) and furthermore that deterioration in magnetic characteristics of a metal powder and metal powderbased recording elements proceeds easilywith the passage of time.

For safety purposes, ferromagnetic metal fine powders subjected to the above stabilization treatments are sometimes dipped in a solvent and then handled.

It is also known that magnetic recording elements produced using magnetic powders containing $SO_4^{--}$ and $Cl^-$ are adversely affected in magnetic recording capability by the $SO_4^{--}$ and $Cl^-$. To eliminate such a problem, $SO_4^{--}$ and $Cl^-$ removal procedures have been proposed (see Japanese Patent Publications 11733/75 and 27118/73).

Additionally, Japanese Patent Publication 11733/75 discloses a method in which goethite or γ-Fe$_2$O$_3$ is heated in air at 600°–800° C. for more than 1 hour to dissipate SO$_4{}^{--}$ as SO$_3$ or SO$_2$ gas, and Japanese Patent Publication 27118/73 discloses washing with an aqueous medium to remove water-soluble impurities after conversion into magnetite or maghemite.

It has now been found that even after SO$_4{}^{--}$ and Cl$^-$ have been removed by the above described methds, at steps where magnetic powders are reduced to ferromagnetic metal fine powders, SO$_4{}^{--}$, Cl$^-$, K$^+$ and Na$^+$ result as impurities and enter into the ferromagnetic metal fine powders formed, i.e., even though these impurities are removed while processing in the state of iron oxyhydroxide, or magnetite or maghemite, such impurities which exist in the interior of the crystals of the starting materials are released when the starting materials are reduced to the metal state. Further, this tendency is marked when starting materials modified by Co, Ni, etc., rather than pure Fe particles are used, and is increased when the proportions of Co, Ni, etc., are high.

Furthermore, it has been found that when reduction is continued until the ferromagnetic metal fine powders are obtained, water-soluble salts of metals comprising the ferromagnetic metal (for example, iron, cobalt, nickel) and other added metals (for example, chromium, manganese, zinc, etc.) are formed.

In general, ferromagnetic metal fine powders have hitherto often been dipped in organic solvents prior to handling; however, water-soluble components containing SO$_4{}^{--}$, Cl$^-$, Na$^+$, K$^+$, etc., are not removed and remain as impurities in the ferromagnetic metal fine powders to yield the following disadvantages:

(1) Areas of a magnetic recording element formed therefrom which are in contact with a magnetic head, a cylinder, a tape guide, etc., at high temperature and humidity are subject to corrosion or discoloration.

(2) The surface of the magnetic layer of the magnetic recording element deteriorates with time.

(3) When the tape is dipped in brine, rust is easily formed.

SUMMARY OF THE INVENTION

An object of this invention is to provide an improved process for producing magnetic recording elements which are free from the defects of prior art magnetic recording elements as described above.

Another object of this invention is to stabilize ferromagnetic metal fine powders with substantially no reduction in magnetic characteristics and to provide magnetic recording elements having high stability with the passage of time.

A further object of this invention is to provide ferromagnetic metal fine powders having improved wetting properties with binders and, at the same time, to provide magnetic recording elements having a magnetic layer with good surface properties.

This invention, therefore, provides a process for producing a magnetic recording element, which comprises preparing a coating composition including ferromagnetic fine metal powders that are mainly composed of iron and are produced by a dry reduction method and coating the composition on a non-magnetic support to provide a magnetic recording layer, in which the ferromagnetic fine metal powders are washed with an aqueous solvent or an organic solvent having high polarity, or further contacted with an aqueous solution of a surface active agent, before preparing the coating composition.

DETAILED DESCRIPTION OF THE INVENTION

As ferromagnetic metal fine powders obtained by a dry reduction method and comprising mainly iron used in this invention, those produced by methods (1) to (3) described above are suitable. In particular, those produced by methods (1) and (2) are preferred.

Methods (1), (2) and (3) as described above will hereinafter be described in more detail.

METHOD (1)

Thermal Decomposition of Organic Acid Salts of Ferromagnetic Metals Followed by Reduction Organic acid salts of ferromagnetic metals, i.e., metal-organic acid salts containing at least one of nickel, cobalt and iron (e.g., oxalates, formates, phthalates, etc.) are decomposed by heating in a non-oxidizing atmosphere to produce ferromagnetic metal fine powders.

Examples of such metal-organic acid salts are ferrous oxalate, ferric oxalate, cobalt (II) oxalate, cobalt (III) oxalate, nickel oxalate, ferrous formate, ferric formate, cobalt (II) formate, nickel formate, iron phthalate, cobalt phthalate and nickel phthalate.

The metal-organic acid salt or salts is/are added with small amounts of non-magnetic metals or with organic compounds adsorbed on the surface of the metal-organic acid salt for the purpose of preventing sintering and deformation in shape during reduction.

The thermal decomposition is carried out in a reducing atmosphere, e.g., hydrogen, carbon monoxide, natural gases, incompletely burned hydrocarbons, gases resulting from the decomposition of ammonia, town gas, etc., can be used.

The temperature at which thermal decomposition is carried out should be sufficiently high to decompose the metal-organic acid salts, but insufficient to cause sintering of the metal-organic acid salts; thus, thermal decomposition is generally carried out at temperatures ranging between about 150° C. and about 500° C., preferably between about 250° C. and about 450° C.

Raising the temperature until it reaches the thermal decomposition temperature and cooling after the completion of thermal decomposition are carried out in a non-oxidizing atmosphere, such as the above reducing atmosphere, nitrogen, inert gases (e.g., He, Ne, Ar, Kr, Xe, etc.), etc. The thermal decomposition time is subject to no special limitations, and it is usually in the range of from 30 minutes to 24 hours.

METHOD (2)

Reduction of Iron Oxyhydroxides or Iron Oxide

A needle-shaped iron oxyhydroxide(s) alone or with other metals added thereto, or needle-shaped iron oxide(s) obtained from such oxyhydroxides alone or with other metals added thereto are reduced to produce ferromagnetic metal fine powders. To prevent sintering and deformation in shape during reduction, oxyhydroxides or oxides with organic substances adsorbed on the surface thereof or with inorganic compounds added thereto are used.

As needle-shaped iron oxyhydroxides, goethite (α-FeOOH), β-FeOOH, lepidocrocite (γ-FeOOH) and the like can be used. Examples of needle-shaped iron oxides which are obtained from such oxyhydroxides include hematite (α-$Fe_2O_3$), maghemite (γ-$Fe_2O_3$), magnetite ($Fe_3O_4$), Bertholide iron oxides of magnemite and magnetite ($FeO_x$: $1.33 < x < 1.50$), Wustite (FeO), etc. Examples of other metals which can be added to such oxyhydroxides or oxides include Co, Ni, Cr, Mn, Zn, Si, Ti, Ag, Bi, etc.

Reduction is carried out in a reducing atmosphere. As the reducing atmosphere, hydrogen, carbon monoxide, natural gases, incompetely burned hydrocarbons, gases resulting from the decomposition of ammonia, town gas, etc., can be used. The reduction temperature should be as sufficiently high to reduce the above oxyhydroxide or iron oxide to the corresponding metal but insufficient to cause sintering of the oxyhydroxides or iron oxides; generally a reduction is carried out at temperatures ranging between 350° C. and 800° C.

Raising the temperature to the reduction temperature and cooling after the completion of reduction are carried out in a non-oxidizing atmosphere (a reducing atmosphere as above exemplified, $N_2$, an inert gas as earlier exemplified, etc.). While reduction time is not critical, it is preferred to complete the reduction in as short a period as possible.

Ferromagnetic metal fine powders produced by method (2), particularly containing 3 to 40% by weight, preferably 3 to 20% by weight, of Co are very effective to raise coercive force and are therefore especially suitable for use in this invention.

METHOD (3)

Evaporation in a Low Pressure Inert Gas

In accordance with this method, magnetic metals or their alloys, or alloys of magnetic metals and non-magnetic metals are evaporated by heating and then flocculated to produce ferromagnetic metal fine powders.

In more detail, the desired starting materials are placed in one or more heat-resistant crucibles made of ceramic (such as magnesia, alumina, zirconia or the like) and evaporated by heating to greater than the melting point thereof in an inert gas such as $N_2$, He, Ar, Ne, Kr, Xe or the like by application of plasma arc, electron beam, laser beam, high frequency induction, etc., singly or in combination with each other. The so evaporated metals are flocculated in the optional presence of a magnetic field to obtain ferromagnetic metal fine powders. Flocculation in a magnetic field permits one to obtain a firmly and linearly flocculated powder (it is possible to impart shape anisotropy).

The apparatus is typically evacuated to about $10^{-3}$ to $10^{-5}$ Torr and the inert gas is introduced therein to adjust the pressure to 0.1 to 300 Torr.

It is preferred to vary the pressure of the atmosphere used depending upon the type of gas used. For example, in the case of Ar, the pressure is preferably 0.1 to 30 Torr, Xe 0.1 to 10 Torr and He 1 to 300 Torr. The temperature of the gas is −20° C. to 60° C., preferably 0° C. to 30° C.

The strength of the magnetic field, when used in the flocculation of the metal or alloy vapor, is more than about 100 Oe, preferably 500 Oe to 5,000 Oe. This range is preferred in that fine particles are linearly joined with each other, resulting in increased orientation in the magnetic field of the ferromagnetic metal fine powder formed.

In this evaporation method, in addition to the above ferromagnetic metals [i.e., Fe, Co, Ni and alloys thereof with other metals], gadolinium, terbium, dysprosium and the like can also be added.

As a heating method for use in the evaporation, it is preferred to employ a high frequency smelting furnace because of its high energy efficiency. Preferred frequencies are from 100 KHz to 1,000 KHz, and the range of from 400 KHz to 500 KHz is particularly preferred. The output of the high frequency generator is preferably more than 10 KW, especially preferably more than 50 KW. Low outputs are not preferred because it is difficult to raise the temperature in the furnace.

The temperature of the furnace at the evaporation is more than 1,600° C. but below the temperature where the furnace might be damaged (at present, about 2,300° C.), with the range of from 1,600° C. to 1,800° C. being preferred.

With regard to the particle size of metals or alloys obtained by this evaporation method, such can be freely varied from about 50 Å to about 1,000 Å by changing the pressure and type of the inert gas introduced into the evaporator. The range of from 100 Å to 300 Å is preferred in that particles having high coercive force are obtained. It is not preferred that the particle size be too small since the particles formed are easily oxidized because of low stability. It is also not preferred that the particle size be too large since high coercive force can not be obtained, even if the stability is improved.

Following obtaining of a ferromagnetic metal fine powder as above in the process of this invention, washing of the ferromagnetic metal fine powder with an aqueous solvent or an organic solvent having high polarity can be directly carried out by bringing the ferromagnetic metal fine powder into contact with an aqueous solvent or an organic solvent having high polarity.

The ferromagnetic metal fine powder is subjected to this washing treatment at temperatures of 200° C. or less, directly after production thereof by the dry reduction method or after being subjected to a gradual oxidation treatment. Moreover, when the ferromagnetic metal fine powder is once dipped in a non-aqueous organic solvent, directly after the production thereof or after being subjected to a gradual oxidation treatment, it can be treated with the aqueous solvent or the organic solvent having high polarity, prior to or after removal of the non-aqueous organic solvent.

The optional gradual oxidation treatment provides an oxide layer or a sulfide layer (which is more than a mono or more -molecular layer) on the surface of the ferromagnetic metal fine powder to thereby stabilize the surface. Thereafter, as described later, the ferromagnetic metal fine powder is subjected to the washing treatment with the aqueous solvent or the organic solvent having high polarity.

By the term "gradual oxidation treatment" as used herein is meant that the ferromagnetic metal fine powders are reacted with substances which are reactive with said metal and which are in the gas state at ordinary temperature, i.e., reactive gases such as $O_2$, $H_2S$, etc., in a gradual fashion so as to not cause the ferromagnetic metal fine powder to ignite and is a step wherein the atmosphere surrounding the ferromagnetic metal fine powder is gradually changed from a non-reactive (non-oxidizing) atmosphere (e.g., He, Ne, Ar, etc.) to the above reactive atmosphere.

When oxygen is used as a reactive gas, an oxide layer is, as described above, formed on the surface of the ferromagnetic metal fine powder, while when hydrogen sulfide is used, a sulfide layer is formed.

After removal of the ferromagnetic metal fine powder after gradually raising the oxygen partial pressure to the same level as or more than that of air, the gradual oxidation treatment is completed.

The conditions under which the reactive gas is introduced are not critical, and it is sufficient to choose conditions at which the ferromagnetic metal fine powder is prevented from igniting. The temperature may be raised in order to accelerate the oxidation rate. In general, however, when the gradual oxidation is carried out as gradually as possible, a uniform oxide film is obtained and the ferromagnetic metal fine powder is highly stabilized. It is desirable to carry out the gradual oxidation over a period of 5 hours or more.

In more detail, the gradual oxidation treatment is carried out by gradually changing the atmosphere from a nonreactive one to a reactive one using the reactive one as a purge gas. As such a purge gas, a mixture containing 0.01 to 14%, preferably 0.5 to 8%, oxygen, the remainder being $N_2$ and/or another inert gas, is used. It is also possible to use oxygen per se or air per se, and, additionally, $H_2S$.

The treating period is controlled depending upon the concentration of oxygen or $H_2S$ in the purge gas, the rate at which the atmosphere is switched to the purge gas, and the temperature of the atmosphere. The treatment is usually carried out within 3 hours to 120 hours and preferably for 5 hours or more. In order to prevent sintering of the metal powder, the temperature of the atmosphere is 180° C. or less, preferably 100° C. or less. Usually, operation carried out at room temperature.

While the gradual oxidation treatment can be carried out in a reduction furnace (or a bell jar (vacuum evaporator)), it is efficient and preferred that the ferromagnetic metal fine powder be transferred to a tank where the gradual oxidation is exclusively carried out and the powder treated therein. The pressure during the gradual oxidation treatment is not critical, and gradual oxidation is usually carried out at atmospheric pressure.

After gradual oxidation is completed, the ferromagnetic metal fine powder is treated with the aqueous solvent or the organic solvent having high polarity either in the same atmosphere or after being removed to ambient, i.e., air. The gradual oxidation treatment can be omitted and the ferromagnetic metal fine powder can be directly treated with the aqueous solvent or the organic solvent having high polarity, if desired.

This invention is characterized by the washing using the aqueous solvent. Aqueous solvents which can be used in the present invention include water and mixtures of water and organic solvents miscible with water, such as alcohols (e.g., methanol, ethanol, propanol, butanol, etc.) and ketones (e.g., acetone, cyclohexanone, etc). The organic solvent miscible with water constitutes less than 50% by weight of the aqueous solvent; that is, water is used in a proportion of 50% by weight or more.

Where it is desired to avoid water, it is also possible to wash using organic solvents having high polarity, such as methanol, ethanol, acetone and the like. In this case, methanol is particularly preferred.

The effect of the present invention cannot be attained merely by dipping the ferromagnetic metal fine powder in the aqueous solvent, and the powder must be washed with the aqueous solvent. Before washing and before exposing to air, the metal fine powders can be subjected to a dipping step to wet the surface of the metal fine powders, which have been obtained, for example, by the reduction with $H_2$ gas followed by replacement of the $H_2$ gas with $N_2$. This dipping can be performed by adding water or toluene into the reaction chamber where the metal fine powders are formed. This dipping step is preferably performed because the metal fine powders easily catch fire as fresh surfaces of the metals are directly exposed to air. The amount of water or toluene used in this dipping step may be small, as long as it wets the metal surface, and similarly, the length of time may be short.

According to the present invention, the ferromagnetic metal fine powder is washed, continuously or batchwise using water or mixtures of water and the organic solvent miscible with water in an amount of 5 parts by weight or more per part by weight of the powder. It is preferred to wash with the solvent in an amount of 50 parts by weight or more per part by weight of the powder. Although the washing time varies depending upon the temperature, method, scale and amount of solvent, etc., it is usually 10 minutes or more and preferably 1 hour or more.

In order to increase the effect of the washing, it is preferred to raise the temperature of the solvent to near the boiling point thereof, or to apply mechanical or magnetic vibration, stirring, shearing, etc., or to pulverize the powder or render the same finer.

The washing in accordance with the present invention is carried out until the following results are obtained: after irradiation of a mixture of 1 part by weight of the powder and 20 parts by weight of water with supersonic waves (29 KHz; 5 minutes), the powder is separated and the conductivity of the aqueous solution is measured and is found to be 50 m /cm or less, preferably 1 m /cm or less. The washing of the present invention differs from a dipping in that in washing, the contacting of the washing medium with the powder is carried out with sufficient amounts of the washing medium and for a sufficient length of time so that the conductivity according to the just described test is 50 m /cm or less, whereas in dipping the conductivity is not decreased in an amount which satisfies this test.

The washing step is performed to wash the metal fine powders (which preferably have been separated as by filtration or decantation from water or toluene employed in any previous dipping) with an aqueous solvent (water, methanol, ethanol, acetone or a mixture thereof) until the conductivity becomes 50 m /cm or less when the conductivity test is performed. In continuous washing, the aqueous solvent is continuously fed to the metal fine powders in, e.g., a centrifugal machine until the conductivity becomes 50 m /cm or less. In batchwise washing, the washing and separation of metal fine powders are repeated until the conductivity becomes 50 m /cm or less. By this washing step, impurities such as $K^+$, $Na^+$ $SO_4^{--}$, $Cl^-$, etc. and water-soluble components of Fe, Co, Ni, etc. can be removed.

Washing is preferably conducted until the amount of sulfur components or chlorine components contained in the powder in the dry state reaches 1 mol % or less, preferably 0.5 mol % or less, based on the ferromagnetic metals (Fe, Co, Ni) contained in the powder. Further it is preferred to wash the powder until the amounts of water-soluble components of Fe, Co, Ni and other added metals contained in the powder in the dry state reaches 2,000 ppm or less, preferably 500 ppm or less, based on the weight of the powder. In particular, it is important to remove water-soluble iron components.

After soluble inorganic and organic substances contained in the ferromagnetic metal fine powder are fully washed and removed by the above washing treatment, the ferromagnetic metal fine powder is mixed with a binder, a coating solvent and the like and dispersed therein, coated on a nonmagnetic support and dried to form a magnetic layer.

Alternatively, after the washing treatment, the ferromagnetic metal fine powder can be, directly or after being subjected to conventional surface treatments, transferred into an organic solvent and, thereafter, mixed with the binder, the coating solvent and the like and dispersed therein, coated on the non-magnetic support and dried to form the magnetic layer.

For the above surface treatment, there can be employed a method in which the surface of metal particle is treated with surface active agents, as described for example in Japanese Patent Applications (OPI) 104903/75 and 128504/76 and U.S. Pat. No. 4,076,861.

Preferred surface active agents for use in this surface treatment are water soluble surface active agents such as (1) anionic surface active agents, (2) cationic surface active agents, (3) amphoteric surface active agents and (4) nonionic surface active agents.

Of these surface active agents, (1) anionic surface active agents are preferred, and those anionic surface active agents described in U.S. Pat. Nos. 4,063,000 and 4,197,347 can be used.

The anionic surface active agents are preferably in the form of an aqueous solution (which may contain 0 to 50% by weight of a polar organic solvent(s) miscible with water, such as alcohols, ketones, dioxanes, etc.) in an amount of about 1% by weight to about 10% by weight based upon the ferromagnetic metal fine powder.

Particularly preferred anionic surface active agents are alkali metal (e.g., Na, K, etc.) salts of saturated or unsaturated aliphatic acids, such as sodium laurate, sodium myristate, potassium myristate, sodium palmitate, sodium stearate, potassium stearate, sodium oleate, potassium oleate, sodium linolate and sodium linolenate.

Attention should be paid to storing the ferromagnetic metal fine powder to retain its surface activity. It has been found that those ferromagnetic metal fine powders treated with the aqueous solvent or the organic solvent having high polarity according to this invention are highly stabilized and remain stable even if stored in an aqueous solvent, in the dry state or in organic solvent.

The term "ferromagnetic metal fine powder" as used herein means a fine powder of a metal or alloy having ferromagnetism. In the dry state, the ferromagnetic metal fine powder has a metal content of about 75% by weight to about 90% by weight, preferably 80% by weight or more, balance hydrogen and oxygen as water, and hydroxide(s) and oxide(s) in an amount of about 25% by weight or less, preferably 20% by weight or less, more preferably from 1% by weight to 15% by weight.

Of the metal content, the ferromagnetic metal component is about 80% by weight or more, preferably 85% by weight to 100% by weight. The ferromagnetic metal must comprise Fe, that is, it is a metal or alloy of Fe, Fe-Co, Fe-Ni or Fe-Co-Ni and of the ferromagnetic metal the Fe content is about 50% by weight or more, preferably 70 to 100% by weight, and about 50% by weight or less, preferably 0.1 to 30% by weight, of the remainder is Co, Ni or Co-Ni when these elements are present.

The above metal component may contain in addition to the ferromagnetic metal, other non-magnetic metals (about 10% by weight or less, preferably 0.05 to 5% by weight) and/or non-metallic elements (about 10% by weight or less, preferably 0.1 to 5% by weight).

Examples of such non-magnetic metals and non-metallic elements include B, C, N, Al, Si, P. S, Ti, Cr, Mn, Cu, Zn, Mo, Pd, Ag, Sn, Sb, Ba, La, Ce, Sm, W, Pb and the like. In some cases, two or more of these metals and elements may be present at the same time.

With regard to the particle size of the ferromagnetic metal fine powder of this invention, the average particle width is 500 Å or less, preferably 150 to 400 Å, and the average acicular ratio (particle length/particle width) is 3 or more, preferably 5 to 20.

With respect to magnetic characteristics, the saturation magnetization ($\sigma s$) (measured at Hm=10 KOe) is about 110 to 170 emu/g and the coercive force (Hc) is about 800 Oe or more, preferably 900 to 2,500 Oe.

As a binder, water-soluble binders can be used as well as conventional binders used for magnetic recording elements. The mixing ratio (by weight) of the ferromagnetic metal fine powder to the binder is generally from 10/1 to 5/2.

The thus obtained ferromagnetic metal fine powder is mixed with a binder (dispersed therein) and coated as a magnetic coating solution on a non-magnetic support to thereby provide a magnetic recording element per this invention. The method for production of the magnetic recording element and illustrative useful coating layer compositions are described in detail in U.S. Pat. No. 4,135,016.

The effects and advantages of this invention are as follows:
(1) Corrosion or discoloration of those parts which are in contact with a magnetic tape, such as a magnetic head, a cylindrical drum, a guide pole, etc. of magnetic recording devices (e.g., an audio tape recorder and a video tape recorder) is prevented.
(2) Deterioration of the surface of a maganetic layer is reduced and the practical quality is increased.
(3) The formation of rust is prevented.
(4) Stability of the ferromagnetic metal fine powder against oxidation and safety during transportation and storage are increased.
(5) Because of the good compatibility of the ferromagnetic metal fine powder with binders, a wide variety of binders can be utilized and a ferromagnetic metal fine powder having excellent dispersibility is obtained.
(6) A magnetic recording element having excellent electromagnetic conversion characteristics is obtained.

The following examples and comparative examples are given to illustrate this invention in greater detail, but it will be apparent to those skilled in the art that modifications and changes can be made to the components, proportions, order of operations, etc., as described above and hereafter without departing from the spirit of this invention and that this invention is not limited to the examples.

The magnetic characteristics of the powders and magnetic tapes hereafter measured were all measured using a Vibration Sample Magnetometer (Model VSM-III, produced by Toei Kogyo); in the case of a ferromagnetic metal fine powder, measurement was carried out in a magnetic field (Hm) of 10 KOe, and in the case of a magnetric tapes, at 5 KOe. The apparent density (packing ratio) of any powder sample at measurement was adjusted to 0.85 g/cm$^3$ or values corrected therto were employed. All parts are by weight.

EXAMPLE 1

(1) Production of Needle-shaped Goethite (Sample A)

Upon reacting ferrous sulfate (FeSO$_4$·7H$_2$O) with sodium hydroxide (NaOH) there was obtained needle-shaped goethite ($\alpha$-FeOOH) having an average particle length of 0.3 $\mu$m and an average particle width of 380 Å. This is designated as Sample A. (With regard to this step, see Japanese Patent Publication 4825/62 and Japanese Patent Application (OPI) 15699/74.)

(2) Production of Co-containing Needle-shaped Goethite (Samples B to D)

Cobalt Chloride (CoCl$_2$·6H$_2$O) was added to a slurry prepared by dispersing 1.5 Kg of Sample A in 40l of water and uniformly dissolved therein by stirring. Thereafter, by adding ammonia while continuing the stirring, Goethite containing 5% by weight Co (Sample B), Goethite containing 10% by weight Co (Sample C) and Goethite containing 20% by weight Co (Sample D) was obtained. These samples were nearly equal in particle size to Sample A. (With regard to this step, see Japanese Patent Publications 4825/62 and 6538/66.)

(3) Production of Needle-shaped Ferromagnetic Iron Oxide (Maghemite) (Samples E to H)

Samples A to D were each fully washed with water, dried, dehydrated by heating at 350° C. and reduced at 350° C. by H$_2$ gas to thereby obtain needle-shaped Magnetite (Fe$_3$O$_4$). This Magnetite was oxidized using O$_2$ gas at 350° C. to thereby obtain needle-shaped Maghemite ($\gamma$-Fe$_2$O$_3$).

Needle-shaped Maghemite, needle-shaped Maghemite containing 5% by weight Co, needle-shaped Maghemite containing 10% by weight Co and needle-shaped Maghemite containing 20% by weight Co are designated respectively as Samples E, F, G and H.

With these samples, the average particle length was 0.2 to 0.3 $\mu$m and the acicular ratio about 8. (With regard to this step, see Japanese PatentPublication 6538/66.)

(4) Production of Ferromagnetic Alloy Fine Powder (Sample Nos. 1 to 24)

Samples A to H were each fully washed with water, dried, reduced using H$_2$ gas at 400° C. for 3 hours and gradually cooled in N$_2$ gas to provide eight ferromagnetic metal fine powders.

Each of the eight ferromagnetic metal fine powders was divided into three portions. These portions were subjected to the following treatments, respectively.

(i) Treatment I (Comparison Samples 1 to 8)

Ferromagnetic metal fine powders as obtained above in N$_2$ gas after reduction were dipped in toluene and, then removed from the toluene by filtration or decantation and exposed to the air. The dipping in toluene does not result in the desired decrease in conductivity. The thus treated ferromagnetic metal fine powders are designated Samples 1 to 8, respectively, corresponding to the starting materials Samples A to H.

(ii) Treatment II (Comparison Samples 9 to 16)

Ferromagnetic metal fine powders are obtained above in N$_2$ gas after reduction were dipped in 3 parts by weight of water per part by weight of the powders for 1 hour, followed by filtration in a centrifugal machine to remove the water. The resulting metal fine powders were then exposed to air in the same manner as above. The dipping in water does not result in the desired decrease in conductivity. These powders are designated Samples 9 to 16.

(iii) Treatment III (Samples 17 to 24 according to the Present Invention)

Ferromagnetic metal fine powders as obtained above in N$_2$ gas after reduction were dipped in 3 parts by weight of water per part by weight of the powders for 1 hour, followed by filtration using a centrifugal machine. The dipping in water does not result in the desired decrease in conductivity. The separated powders then fully washed in water until the conductivity was 1 m$\upsilon$/cm as determined according to the conductivity test described above. This full washing of the separated powders was achieved in the centrigural machine in 20 minutes by feeding 100 parts by weight of water per part by weight of the powders. After the conductivity became 1m$\upsilon$/cm, the powder was separated from the wash water, and thereafter exposed to air. These powders are designated Samples 17 to 24.

The metal fine powders of Samples 1 to 24 obtained in Treatments I to III were each then dipped in 5 parts by weight of acetone per part by weight of the powders for three hours, followed by filtration using a centrifugal machine, and then gradually dried in the air at ambient temperature over a period of 24 hours, further dried at 40° C. for 2 hours and, thereafter, their composition and magnetic characteristics were measured. The purpose of this dipping step is to facilitate the drying of the metal fine powders by substituting acetate for the water or toluene which was used in and still present from the previous step. Water and toluene have relatively high boiling points and are not liable to evaporate whereas acetone has a low boiling point and thus facilitates the subsequent drying which is followed by the measuring of the composition and magnetic characteristics of the dried metal fine powders. In general, this dipping step can be performed by charging the water- or toluene-wetted metal fine powders and acetone in a chamber, and thereafter separating the metal fine powders by filtration or decantation. This dipping in acetone does not result in the desired decrease in conductivity for Samples 1 to 16.

It was confirmed that for Samples 21 to 24 obtained from Samples E to H (maghemite), the time required until the conductivity reached 1 m /cm by water washing was shorter than for Samples 17 to 20 obtained from Samples A to D (Goethite). Thus, Samples 21 to 24 employing fine metal powders produced from iron oxides which were produced after water-washing of the goethites are an especially preferred embodiment of the present invention inasmuch as the time for the required water washing of the present invention was shorter.

With respect to particle size of each of Samples 1 to 24, the average particle width was 280 to 350 Å and the acicular ratio 5 to 10.

Composition and magnetic characteristics are shown in Table 1.

TABLE 1

| Sample No. | Starting Material (Sample) | Metal Composition (wt. %) Fe | Metal Composition (wt. %) Co | Magnetic Characteristics (Hm = 10 KOe) Saturation Magnetization $\sigma s$ (emu/g) | Magnetic Characteristics (Hm = 10 KOe) Coercive Force Hc (Oe) |
|---|---|---|---|---|---|
| 1 | A | 92.6 | — | 150.5 | 1,140 |
| 2 | B | 87.7 | 4.4 | 153.5 | 1,190 |
| 3 | C | 84.0 | 8.3 | 154.2 | 1,250 |
| 4 | D | 78.4 | 15.6 | 154.0 | 1,330 |
| 5 | E | 93.2 | — | 151.2 | 1,130 |
| 6 | F | 87.9 | 4.4 | 154.0 | 1,170 |
| 7 | G | 84.5 | 8.4 | 154.7 | 1,240 |
| 8 | H | 78.8 | 15.7 | 154.2 | 1,320 |
| 9 | A | 89.1 | — | 149.0 | 1,160 |
| 10 | B | 85.0 | 4.2 | 150.9 | 1,220 |
| 11 | C | 81.3 | 8.1 | 151.2 | 1,260 |
| 12 | D | 74.2 | 14.8 | 151.0 | 1,350 |
| 13 | E | 89.6 | — | 149.1 | 1,150 |
| 14 | F | 85.3 | 4.2 | 151.2 | 1,210 |
| 15 | G | 81.9 | 8.2 | 152.0 | 1,260 |
| 16 | H | 74.5 | 14.9 | 152.0 | 1,360 |
| 17 | A | 82.2 | — | 140.0 | 1,180 |
| 18 | B | 79.1 | 3.9 | 141.5 | 1,240 |
| 19 | C | 75.2 | 7.5 | 143.0 | 1,270 |
| 20 | D | 69.5 | 13.8 | 143.1 | 1,370 |
| 21 | E | 82.9 | — | 140.2 | 1,190 |
| 22 | F | 79.3 | 3.9 | 142.0 | 1,220 |
| 23 | G | 75.3 | 7.5 | 144.1 | 1,270 |
| 24 | H | 69.7 | 13.8 | 145.2 | 1,370 |

With the ferromagnetic metal fine powders subjected to Treatment I, i.e., Samples 1 to 8, after adjustment of the weight ratio of the ferromagnetic metal fine powder to the solvent (toluene) to ½ to form a cake, corresponding magnetic tapes were produced by the method described hereinafter. The term "cake" as used herein means a mixture containing a high concentration of solid matter and exhibiting no fluidity.

The other ferromagnetic metal fine powders subjected to Treatment II, i.e., Samples 9 to 16, or to Treatment III, i.e., Samples 17 to 24, were each treated in a manner to substitute acetone for the water present in these samples as a result of the water dipping in Treatment II and the water washing in Treatment III, by dipping each of the metal fine powders in 5 parts by weight of acetone per part by weight of the powders for three hours, followed by filtration using a centrifugal machine. After repeating this procedure three times, the acetone in the powders was replaced with organic solvent, namely, n-butyl acetate. This replacement occurred by transferring the filtered powders into n-butyl acetate. The weight ratio of the powder to the solvent (n-butyl acetate) was adjusted to ½ to form a cake, and corresponding magnetic tapes then were produced by the method as described hereinafter.

Each of the above cakes produced as just described from Samples 1 to 24 was then mixed as ingredient (a) with the following ingredients (b) to (f) in the amounts set forth below:

| | | |
|---|---|---|
| (a) | Ferromagnetic alloy fine powder cake (Powder/solvent = ½ = 300 parts by weight/600 parts by weight) | 900 |
| (b) | Polyesterpolyurethane (Reaction Product of ethylene adipate and 2,4-tolylenediisocyanate; styrene-equivalent average molecular weight: about 130,000) | 30 |
| (c) | Non-drying oil-modified alkyd resin (Reaction product of glycerin-phthalic acid anhydride resin and non-drying oil) | 35 |
| (d) | Carbon black (Average grain diameter: 170 Å) | 20 |
| (e) | Dimethyl polysiloxane (Degree of polymerization: about 60) | 2 |
| (f) | n-butyl acetate | 300 |

The above ingredients were placed in a ball mill and mixed and dispersed for 10 hours, whereafter 22 parts of a triisocyanate compound (75% by weight ethyl acetate solution of an adduct (molecular weight: about 760; NCOK content: 13.3% by weight) of 3 moles of tolylenediisocyanate and 1 mole of trimethylolpropane; Desmondur L-75, trade name, product of Bayer A.G.) was added thereto. The resulting mixture was subjected to high speed sharing dispersion for 1 hour to thereby obtain a magnetic coating solution.

The magnetic coating solution was coated on one surface of a polyethylene terephthalate film having a thickness of 14 μm and a surface roughness of 0.2 μm or less so that the dry thickness was 3 μm, and then subjected to magnetic orientation in a DC magnetic field of 2,500 Oe for 0.02 second and dried by heating at 100° C. for 2 minutes.

The thus obtained broad magnetic web was supercalendered using metal rolls (chromium plated steel roll, backup roll) and nylon rolls (calender rolls) at a roll pressure of 50 Kg/cm, a temperature of 60° C. and a treating rate of 30 m/min; thereafter the product was slit to a width of ½ inch and 3.8 mm to thereby obtain video tapes and audio tapes.

The squareness ratio (Br/Bm) of each of the obtained samples was within the range of 0.80 to 0.83.

The magnetic characteristics and rust prevention effect on each sample are shown in Table 2, from which, among other things, it is seen that Samples 17 to 24 according to the present invention exhibit an excellent rust prevention effect as compared to the other Samples.

TABLE 2

| Tape Sample No. | Magnetic Characteristics (Hm = KOe) Coercive Force (Hc (Oe)) | Magnetic Characteristics (Hm = KOe) Residual Magnetic Flux Density (Br (Gauss)) | Magnetic Characteristics (Hm = KOe) Change with Time of Br (Br' (Gauss)) *Note 1 | Magnetic Characteristics (Hm = KOe) Demagnetizing Factor (%) (ΔBr) *Note 2 | Rust Prevention Effect Corrosion of Cylinder *Note 3 | Rust Prevention Effect Discoloration of Tape *Note 4 | Rust Prevention Effect Formation of Rust *Note 5 |
|---|---|---|---|---|---|---|---|
| 1 | 1,030 | 3,500 | 2,800 | 20.0 | formed on the whole surface | partially discolored | on 1st day |
| 2 | 1,080 | 3,550 | 2,980 | 16.1 | formed on the whole surface | wholly discolored | on 3rd day |
| 3 | 1,130 | 3,560 | 2,980 | 16.3 | formed on the whole surface | wholly discolored | after 1 week |

TABLE 2-continued

| | | | | | | | |
|---|---|---|---|---|---|---|---|
| 4 | 1,210 | 3,550 | 2,970 | 16.3 | formed on the whole surface | wholly discolored | " |
| 5 | 1,020 | 3,520 | 2,890 | 17.9 | partially formed | partially discolored | on 3rd day |
| 6 | 1,060 | 3,580 | 2,920 | 18.4 | partially formed | partially discolored | after 1 week |
| 7 | 1,120 | 3,600 | 2,920 | 18.9 | partially formed | wholly discolored | after 1 week |
| 8 | 1,200 | 3,550 | 2,910 | 18.0 | formed on the whole surface | wholly discolored | " |
| 9 | 1,050 | 3,400 | 2,750 | 19.1 | partially formed | partially discolored | on 1st day |
| 10 | 1,100 | 3,450 | 2,930 | 15.1 | formed on the whole surface | partially discolored | on 3rd day |
| 11 | 1,150 | 3,500 | 2,940 | 16.0 | formed on the whole surface | wholly discolored | after 1 week |
| 12 | 1,230 | 3,500 | 2,940 | 16.0 | formed on the whole surface | wholly discolored | " |
| 13 | 1,040 | 3,440 | 2,930 | 14.8 | partially formed | partially discolored | on 3rd day |
| 14 | 1,090 | 3,500 | 2,960 | 15.4 | partially formed | partially discolored | after 1 week |
| 15 | 1,140 | 3,520 | 2,970 | 15.6 | partially formed | partially discolored | " |
| 16 | 1,220 | 3,510 | 2,960 | 15.7 | formed on the whole surface | wholly discolored | " |
| 17 | 1,060 | 3,200 | 2,980 | 6.9 | not formed | not discolored | no formation |
| 18 | 1,120 | 3,250 | 3,080 | 5.2 | " | not discolored | " |
| 19 | 1,160 | 3,300 | 3,090 | 6.4 | " | not discolored | " |
| 20 | 1,250 | 3,300 | 3,100 | 6.1 | " | not discolored | " |
| 21 | 1,050 | 3,220 | 3,060 | 5.0 | " | not discolored | " |
| 22 | 1,110 | 3,300 | 3,170 | 3.9 | " | not discolored | " |
| 23 | 1,150 | 3,320 | 3,180 | 4.2 | " | not discolored | " |
| 24 | 1,240 | 3,350 | 3,180 | 5.1 | " | not discolored | " |

Note 1: Changed with time of Br
Residual magnetic reflux density (Br': Gauss) after being allowed to stand for one week at 60° C. and at a humidity of 90% RH. Evaluated with a ½ inch wide video tape and a 3.8 mm wide audio tape.

Note 2: Demagnetizing factor (%): ΔBr
Indicated by the equation:
$$\frac{Br - Br'}{Br} \times 100(\%)$$

Note 3: Corrosion of cylinder -
Each sample was placed in a video tape cassette and was set in VHS type VTR (Model NV-8800, trade name for a product of Matsushita Electric Industries Ltd.) and allowed to stand for 1 week at 60° C. and at a humidity of 90% RH in a state such that the cylinder was in contact with the magnetic layer of the magnetic tape. Thereafter, the discoloration or corrosion of the area of the tape in contact with the cylindrical drum was observed. Evaluated with a ½ inch wide viedo tape.

Note 4: Discoloration of Tape
After standing for 1 week at 60° C. and relative humidity of 90%, discoloration in the surface of the magnetic layer was observed.

Note 5: Formation of rust
Each sample was dipped in a 3% by weight aqueous solution of NaCl for 1 week and the time until rust was formed was measured. Evaluated with a 3.8 mm wide audio tape.

Assuming that the suflur (S) content of Tape Samples 1 to 8 was 100%, those of Tape Samples 9 to 16 and Tape Samples 17 to 24 were, respectively, about 50% and about 10%.

With regard to the chlorine (Cl) content, it was found that as the cobalt (Co) content became higher, the chlorine content became higher. For example, assuming that the chlorine content of Tape Sample 4 was 100%, those of Tape Sample 12 and Tape Sample 20 were, respectively, about 50% and about 10%.

Comparison between Samples 1 to 4, 9 to 12 and 17 to 20 which were obtained by direct reduction of Goethite (Samples A to D) and Samples 5 to 8, 13 to 16 and 21 to 24 which were obtained by converting Goethite to ferromagnetic iron oxides (Samples E to H) and then reducing the ferromagnetic iron oxides, i.e., between Samples 1 to 4 and 5 to 8, Samples 9 to 12 and 13 to 16, and Samples 17 to 20 and 21 to 24, with respect to demagnetizing ratio on the basis of the results as illustrated in Tables 1 and 2 confirmed that these magnetic tapes produced using ferromagnetic metal fine powders obtained by the reduction of ferromagnetic iron oxides were generally higher in stability.

Additionally, from the results in Tables 1 and 2, the following was confirmed.

With respect to the state of the ferromagnetic metal fine powder in Samples 1 to 16 (prior art method), Samples 17 to 24 of this invention (subjected to Treatment III) generally had a low metal content and saturation magnetization ($\sigma s$), but their characteristics as ferromagnetic metal fine powder were sufficiently satisfactory. Therefore, magnetic recording tapes produced using Samples 17 to 24 of this invention had magnetic characteristics which were equal to or better than those of the prior art. In particular, these tapes showed excellent magnetic characteristics stability and excellent in practical stability and were of high practical utility.

In addition, similar results were obtained using a vinyl chloride-vinyl acetate copolymer in place of the alkyd resin of the magnetic coating solution in Example 1.

EXAMPLE 2

From the ferromagnetic metal fine powders produced in Example 1, Sample 10 (Treatment II) and Sample 18 (Treatment III) were selected; they were treated with a surface active agent as follows:

To Sample 10 (subjected to Treatment II) and Sample 18 (subjected to Treatment III) was added a 8% by weight aqueous solution of sodium oleate in a proportion of 4 weight parts of solution per weight part of the powder. The resulting mixture was mixed and dispersed at ambient temperatures for 7 hours, dehydrated, dipped in 3 weight parts of acetone to facilitate subsequent drying of the metal fine powders, dried at room temperature and then further dried at 40° C. for 2 hours. Thereafter, the characteristics of each sample were measured.

The ferromagnetic metal fine powders obtained from Samples 10 to 18 were designated, respectively, as Samples 25 and 26.

After drying, Samples 25 and 26 were used to produce magnetic tapes in the same manner as in Example 1. The characteristic values of these samples are shown in Tables 3 and 4.

TABLE 3

| Sample No. | Metal Composition (wt. %) Fe | Co | Magnetic Characteristics (Hm = 10 KOe) Saturated Magnetization σs (emu/g) | Coercive Force Hc (Oe) |
|---|---|---|---|---|
| 25 | 80.1 | 4.0 | 146.2 | 1,230 |
| 26 | 75.2 | 3.8 | 141.9 | 1,260 |

TABLE 4

| Tape Sample No. | Magnetic Characteristics (Hm = 5 KOe) | | | | Rust Prevention Effect | | |
|---|---|---|---|---|---|---|---|
| | Coercive Force Hc (Oe) | Squareness Ratio Br/Bm | Residual Magnetic Reflux Density Br (Gauss) | Change with Time of Br Br' (Gauss) *Note 1 | Demagnetizing Factor (%) Br *Note 2 | Corrosion of Cylinder *Note 3 | Discoloration of Tape *Note 4 | Formation of Rust *Note 5 |
| 25 | 1,110 | 0.84 | 3,450 | 3,060 | 11.3 | partially formed | not discolored | after 1 week |
| 26 | 1,130 | 0.85 | 3,300 | 3,180 | 3.6 | not formed | not discolored | no formation |

Notes 1 to 5: same as in Table 2.

The sulfur content was 1.4 mole % based upon the metal component (Fe+Co) in Samples 25 and 0.3 mole & in Sample 26 (same basis).

As can be seen from the above results, when the treatment using surface active agents is applied, it is important to remove soluble impurities (e.g., $SO_4^{--}$, $Cl^-$, $Na^+$, $K^+$, etc.) and water-soluble metal components by washing ferromagnetic metal fine powders with aqueous solvents as in Treatments III and IV (described in Example 3, hereafter) and this treatment increases the dispersibility of the ferromagnetic metal fine powders, which can be seen from the increase in squareness ratio.

Furthermore, it was confined that the process of this invention permits the production of magnetic recording elements which are improved in stability in various circumstances and with the passage of time and which can be used as audio or video metal tapes having excellent quality as high density recording materials.

EXAMPLE 3

Sample B of Example 1 ws reduced in the same manner as in Example 1 to thereby obtain a ferromagnetic metal fine powder. After reduction, this powder was subjected to gradual oxidation by a known method, immersed in (1) cyclohexane or (2) n-butyl acetate, and then removed therefrom into ambient. Upon removing the solvent by vacuum drying, a dry ferromagnetic fine powder was obtained. After vacuum drying, the powder was gradually brought into contact with the air in order to avoid abrupt contact of the powder with air.

the powders obtained by immersing in (1) cyclohexane and (2) n-butyl acetate were designated, respectively, as Samples 27 and 28.

One weight part of each of Samples 27 and 28 was washed in accordance with the present invention, by decantation with (A) 100 weight parts of water or (B) 5 weight parts of methanol. After removing the solvent in a centrifugal separator, the powder was slowly dried in air at ambient over a period of 48 hours and then further dried at 40° C. for 2 hours to remove the solvent, whereby a dry sample was obtained (Treatment IV).

Thus, four additional samples were prepared as follows:

Samples 29 ... by water washing of Sample 27
Sample 30 ... by water washing of Sample 28
Sample 31 ... by methanol washing of Sample 27
Sample 32 ... by methanol washing of Sample 28.

Using Samples 27 to 32, magnetic tapes were produced in the same manner as in Example 1. Magnetic characteristics, etc., of the powders and the tapers therefrom are shown, respectively, in Table 5 and Table 6.

TABLE 5

| Sample No. | Metal Composition (wt %) Fe | Co | Magnetic Characteristics (Hm = KOe) σs (emu/g) | Hc (Oe) | Water-soluble Fe Component (ppm) |
|---|---|---|---|---|---|
| 27 | 80.2 | 4.0 | 145.8 | 1,220 | 2,440 |
| 28 | 80.3 | 4.0 | 147.9 | 1,240 | 2,850 |
| 29 | 78.2 | 3.9 | 140.5 | 1,240 | 80 |
| 30 | 78.5 | 3.9 | 141.2 | 1,260 | 100 |
| 31 | 79.4 | 3.9 | 143.0 | 1,230 | 250 |
| 32 | 79.8 | 4.0 | 144.6 | 1,240 | 260 |

TABLE 6

| Tape Sample No. | Magnetic Characteristics (Hm = 5 KOe) Hc (Oe) | Br (Gauss) | Br' (Gauss) *Note 1 | ΔBr (%) *Note 2 | Rust Prevention Effect Corrosion of Cylinder *Note 3 | Discoloration of Tape *Note 4 | Formation of Rust *Note 5 |
|---|---|---|---|---|---|---|---|
| 27 | 1,120 | 3,350 | 3,000 | 10.4 | partially | partially | after 1 week |

TABLE 6-continued

| Tape Sample No. | Magnetic Characteristics (Hm = 5 KOe) | | | | Rust Prevention Effect | | |
|---|---|---|---|---|---|---|---|
| | Hc (Oe) | Br (Gauss) | Br' (Gauss) *Note 1 | ΔBr (%) *Note 2 | Corrosion of Cylinder *Note 3 | Discoloration of Tape *Note 4 | Formation of Rust *Note 5 |
| 28 | 1,130 | 3,360 | 3,020 | 10.1 | formed partially formed | discolored partially discolored | after 1 week |
| 29 | 1,130 | 3,150 | 3,030 | 3.8 | not formed | not discolored | no formation |
| 30 | 1,140 | 3,160 | 3,040 | 3.8 | not formed | not discolored | no formation |
| 31 | 1,120 | 3,300 | 3,180 | 3.6 | not formed | not discolored | no formation |
| 32 | 1,130 | 3,330 | 3,180 | 4.5 | not formed | not discolored | no formation |

*Notes 1–5: same as in Table 2.

While the invention has been described in detail and with reference to specific embodiments thereof, it will be apparent to one skilled in the art that various changes and modifications can be made therein without departing from the spirit and scope thereof.

What is claimed is:

1. In a process for producing a magnetic recording element by preparing a coating composition including ferromagnetic metal fine powders that are mainly composed of iron and are produced by a dry reduction method, and coating said composition on a non-magnetic support to provide a magnetic recording layer, the improvement which comprises washing said ferromagnetic metal fine powders with water, methanol, water plus ethanol, water plus acetone, or a mixture thereof before preparing the coating composition, wherein said washing is carried out until the conductivity of an aqueous solution obtained after irradiation of a mixture of 1 part by weight of the ferromagnetic metal fine powder and 20 parts by weight of water with supersonic waves at 29 KHz for five minutes and removal of the fine powder from the mixture is 50 m /cm or less.

2. The process for producing a magnetic recording element as claimed in claim 1, wherein said ferromagnetic metal fine powders are contacted with an aqueous solution of a surface active agent after washing the magnetic fine metal powders and before preparing the coating composition.

3. The process for producing a magnetic recording element as claimed in claim 1, wherein said ferromagnetic matal fine powder is washed with said water.

4. The process for producing a magnetic recording element as claimed in claim 2, wherein said ferromagnetic metal fine powder is washed with said water.

5. The process for producing a magnetic recording element as claimed in claim 3, wherein said washing is carried out using the water in an amount of 5 parts by weight or more per part by weight of the ferromagnetic metal fine powder.

6. The process for producing a magnetic recording element as claimed in claim 3, wherein said washing is carried out for 10 minutes or more.

7. The process for producing a magnetic recording element as claimed in claim 4, wherein said washing is carried out for 10 minutes or more.

8. The process for producing a magnetic recording element as claimed in claim 2, wherein saiud surface active agent is an anionic active agent.

9. The process for producing a magnetic recording element as claimed in claim 8, wherein said anionic surface active agent is an alkali metal salt of saturated or unsaturated aliphatic acids.

10. The process for producing a magnetic recording element as claimed in claim 8, wherein said anionic surface active agent is contacted with the ferromagnetic metal fine powder in an amount of about 1% by weight to about 10% b y weight based on the ferromagnetic metal fine powder.

11. The process for producing a magnetic recording element as claimed in claim 1, wherein said ferromagnetic metal fine powder is subjected to a gradual oxidation treatment prior to said washing.

12. The process for producing a magnetic recording element as claimed in claim 2, wherein said ferromagnetic metal fine powder is subjected to a gradual oxidation treatment prior to said washing.

13. The process for producing a magnetic recording element as claimed in claim 1, wherein said dry reduction method comprises heat-decomposing and reducing an organic acid salt of a ferromagnetic metal in a reducing gas.

14. The process for producing a magnetic recording element as claimed in claim 1, wherein said dry reduction method comprises reducing needle-shaped oxyhydroxides, mixtures of needle-shaped oxyhydroxides and other metals or needle-shaped iron oxides obtained from such oxyhydroxides.

15. The process for producing a magnetic recording element as claimed in claim 1, wherein said dry reduction method comprises evaporating a ferromagnetric metal in a low-pressure inert gas.

16. The process for producing a maganetic recording element as claimed in claim 1, wherein washing is conducted until sulfur components or chlorine components present in the ferromagnetic powder in the dry state will be 1 mol % or less based on ferromagnetic metals present in the powder.

17. The process for producing a magnetic recording element as claimed in claim 1, wherein washing is conducted until the amount of water-soluble components of Fe, Co, Ni and other added metals contained in the powder in the dry state reach 2,000 ppm or less based on the weight of the powder.

18. The process for producing a magnetic recording element as claimed in claim 1, wherein washing is conducted until sulfur components or chlorine components present in the ferromagnetic powder in the dry state will be 1 mol % or less based on ferromagnetic metals present in the powder, and until the amount of water-soluble components of Fe, Co, Ni and other added metals contained in the powder in the dry state reach 2,000 ppm or less based on the weight of the powder.

19. The process for producing a magnetic recording element as claimed in claim 1, wherein said washing is carried out until the conductivity of the aqueous solution is 1 m /cm or less.

20. The process for producing a magnetic recording element as claimed in claim 1, wherein said dry reduction method comprises reducing needle-shaped iron-oxides.

* * * * *